US006990075B2

(12) United States Patent
Krishnamurthy et al.

(10) Patent No.: US 6,990,075 B2
(45) Date of Patent: Jan. 24, 2006

(54) SCALABLE UNIDIRECTIONAL ROUTING WITH ZONE ROUTING PROTOCOL EXTENSIONS FOR MOBILE AD-HOC NETWORKS

(75) Inventors: Srikanth Krishnamurthy, Riverside, CA (US); Prasun Sinha, Middletown, NJ (US); Son K. Dao, Northridge, CA (US)

(73) Assignee: MRL Laboratories, LLC, Malibu, CA (US)

( * ) Notice: Subject to any disclaimer, the term of this patent is extended or adjusted under 35 U.S.C. 154(b) by 767 days.

(21) Appl. No.: 09/764,668

(22) Filed: Jan. 18, 2001

(65) Prior Publication Data

US 2001/0033556 A1    Oct. 25, 2001

Related U.S. Application Data

(60) Provisional application No. 60/182,944, filed on Feb. 12, 2000.

(51) Int. Cl.
*H04J 3/14*    (2006.01)
(52) U.S. Cl. ....................... 370/236; 370/329; 370/400
(58) Field of Classification Search ................ 370/236, 370/238, 329, 400, 408
See application file for complete search history.

(56) References Cited

U.S. PATENT DOCUMENTS

| 6,130,881 | A * | 10/2000 | Stiller et al. ................. 370/238 |
| 6,304,556 | B1 * | 10/2001 | Haas ........................... 370/254 |
| 6,535,498 | B1 * | 3/2003 | Larsson et al. ............. 370/338 |
| 6,704,293 | B1 * | 3/2004 | Larsson et al. ............. 370/255 |
| 2003/0165117 | A1 * | 9/2003 | Garcia-Luna-Aceves et al. .............. 370/238 |

OTHER PUBLICATIONS

Marc Pearlman, Zygmunt Haas, Benjamin Manvell, "Using Multi-Hop Acknowledgements to Discover and Reliably Communicate over Unidirectional Links in Ad Hoc Networks", Wireless Communications and Networking Conference Sep. 2000, IEEE, vol. 2, pp. 532-537.*

Sanket Nesargi, Ravi Prakash, "A tunneling approach to routing with unidirectional links in mobile ad-hoc networks", Conference on Oct. 16-18, 2000, IEEE, pp.: 522-527.*

Jie Wu, Hailan Li, "Domination and Its Applications in Ad Hoc Wireless Networks with Unidirectional Links", 2000 International Conference on , Aug. 21-24, 2000, IEEE, pp.: 189-197.*

Z. J. Haas and M.R. Peartman, "The performance of query control schemes for the zone routing protocol", Proc. Of ACM SIGCOMM '98, Vancouver, British Columbia, Sep. 1998.

C.A. Pomalaza-Racz., "A distributed routing algorithm for multihop packet radio networks with Uni- and Bi-directional links", IEEE Transactions on Vehicular Technology, vol. 44, No. 3, Aug. '95.

(Continued)

*Primary Examiner*—Ricky Ngo
*Assistant Examiner*—Richard Chang
(74) *Attorney, Agent, or Firm*—Tope-McKay & Associates

(57) ABSTRACT

The present invention provides a method and apparatus for extending a zone routing protocol. The invention is configured to provide a robust scalable framework for routing data in wireless ad-hoc networks when unidirectional links 210 are present. When the reverse path from a destination node (the tail) of a unidirectional link 210 to the originating node (the head) of the link is beyond a designated length, the invention is configured to revert to an on-demand search mechanism. The on-demand search mechanism recursively attempts to build a path to the destination 206 by recognizing nodes that have a route to the destination.

36 Claims, 7 Drawing Sheets

OTHER PUBLICATIONS

Haas, Z. Y., et al. "Evaluation of the Ad-Hoc Connectivity with the Zone Routing Protocols" Virginia Tech's Eighth Symposium on Wireless Personal Communications, Clacksburg, VA, USA, Jun. 10-12, 1998, pp. 201-212, XP008001971.

Haas, Z. J., et al. "The performance of query control schemes for the zone routing protocol", Computer Communications Review, Association for Computing Machinery, New York, USA, vol. 28, No. 4, Oct. 1998, pp. 167-177, XP000914433.

Z.J. Haas and M.R. Pearlman, "The Zone Routing protocol (ZRP) for ad hoc networks", Internet Draft draft-zone-routing-protocol-01.txt, Aug. 1998.

L. Bao and J.J. Garcia-Luna-Aceves, "Unidirectional link-state routing with propagation control", INFOCOM, Mar. 2000, to appear.

5. J. Broch, D.A. Maltz, D.B. Johnson, Y.C. HU, and J. Jetcheva, "A performance comparison of multi-hop wireless ad-hoc network routing protocols", In Proceedings of the Fourth Annual ACM/IEEE International Conference on Mobile Computing and Networking, ACM, Dallas, TX, Oct. '98.

* cited by examiner

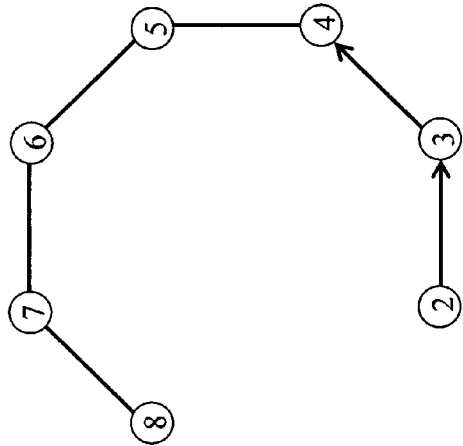
FIG. 3B
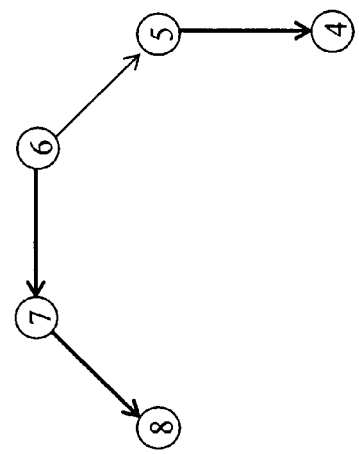
FIG. 3C
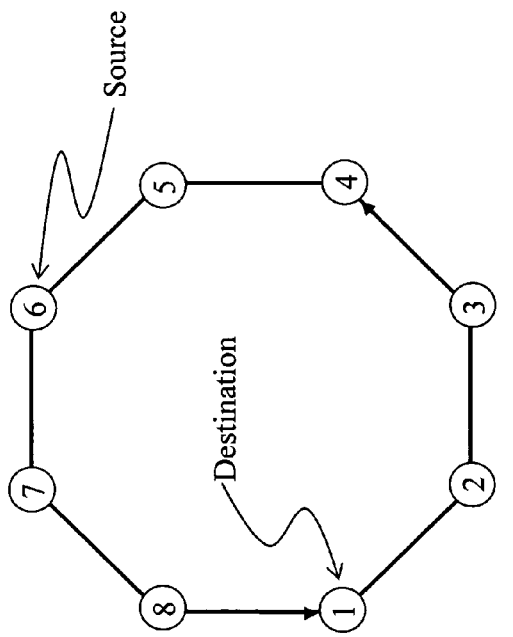
FIG. 3A
FIG. 3

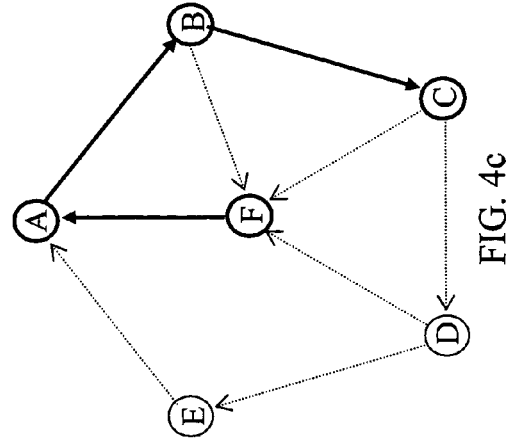
FIG. 4c
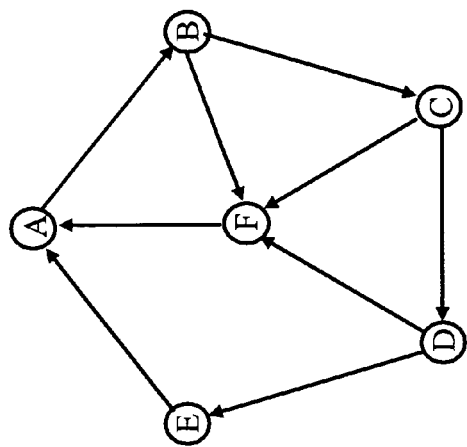
FIG. 4a
FIG. 4
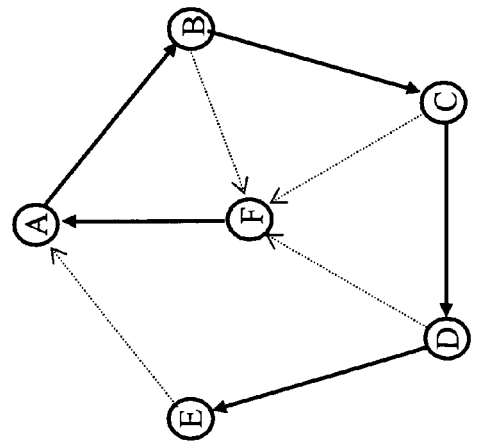
FIG. 4b

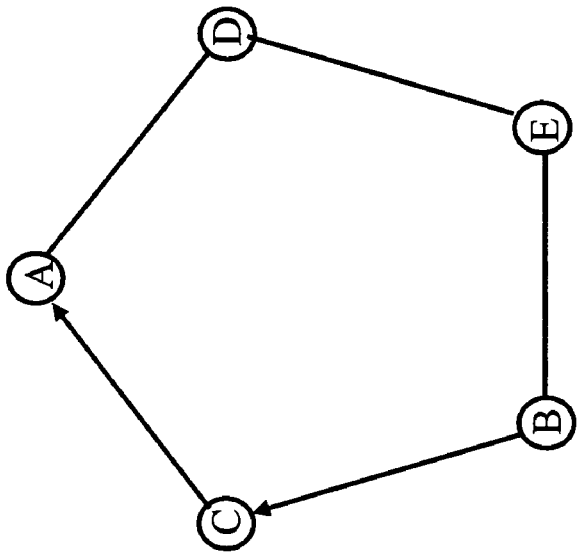
FIG. 6b
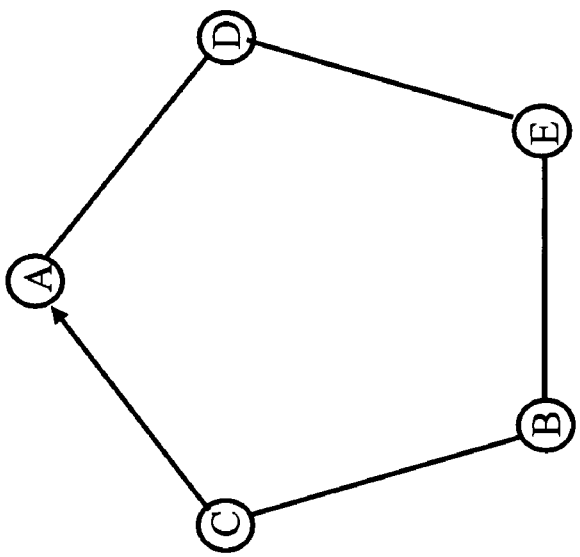
FIG. 6a
FIG. 6

SCALABLE UNIDIRECTIONAL ROUTING WITH ZONE ROUTING PROTOCOL EXTENSIONS FOR MOBILE AD-HOC NETWORKS

CLAIM OF PRIORITY

This application claims the benefit of provisional application No. 60/182,944, titled SCALABLE UNIDIRECTIONAL ROUTING USING ZONE ROUTING PROTOCOL EXTENSIONS FOR WIRELESS NETWORKS, filed Feb. 12, 2000 in the US Patent and Trademark Office.

BACKGROUND

Mobile wireless ad-hoc networks find applications in a broad range of situations, including, rescue operations, law enforcement operations, military deployment and sensor deployment. Wireless ad-hoc networks, in essence, are mobile nodes that communicate with each other. The mobility of the nodes makes the topology of the network time-variant. The rate of change of the network topology depends on a variety of factors including the velocity and relative direction of the nodes. Furthermore, wireless ad-hoc networks are generally characterized by low bandwidth links that are subject to harsh conditions of fading and interference; consequently routing in such networks is highly complex. A plethora of routing protocols have been proposed for wireless ad-hoc networks. These protocols may generally be classified as either proactive or reactive. When proactive routing protocols are employed, a node possesses routing information to a destination before it actually needs to route data to that destination. For this purpose routing tables are maintained. Route updates are exchanged periodically to reflect the changes in topological information. Popular proactive routing protocols for ad-hoc networks include the Destination Sequenced Distance Vector (DSDV) Protocol, the Wireless Routing Protocol, and the Source Tree Adaptive Routing (STAR) Protocol. Conversely, if reactive routing is used, a node would attempt to compute a route to a given destination when it needs to route data to that destination, i.e., on-demand. Numerous on-demand routing protocols have been proposed. Some of the on-demand routing protocols include the Adaptive On-Demand Distance Vector (AODV) protocol, the Dynamic Source Routing (DSR) Protocol and the Temporally Ordered Routing Algorithm (TORA).

The proactive routing protocols usually require the maintenance of routing tables and thus, in the dynamically changing mobile ad-hoc network, nodes need to exchange routing updates periodically. This exchange of route updates consumes bandwidth, and if the network is large, these control messages often contribute to a significant amount of overhead. On the other hand if on-demand routing protocols are used, when data is to be routed to a destination, a source node might be required to initiate a search for the destination. If the network is large, significant latency may be incurred before the destination is found. Thus, the scalability of both the table-driven and the on-demand routing protocols is limited. The Zone Routing Protocol (ZRP) provides a hybrid proactive/reactive routing framework in an attempt to achieve scalability. Each node would maintain routing tables that would only offer routes to a destination if the destination were to be within a certain maximum hop-count (which is called the zone radius) from the source node. If the destination were to be outside the zone radius, the source node would invoke an on-demand search mechanism called bordercasting. Bordercasting provides an efficient means for searching for a destination by sequentially using the routing tables of the intermediate relay nodes.

Existing routing protocols assume that the nodal links in the network are bi-directional in nature. However, a wireless ad-hoc network could potentially consist of a heterogeneous aggregation of nodes with differing transmittal range and reception capabilities. For instance, the transmission range of one node might be different from that of another. Thus, a node (say node A) having a transmission range that is larger than that of another node (say node B) will be able to transmit information to node B, but will be unable to receive the transmissions of node B. This results in the creation of a unidirectional link in the network.

Therefore it is desirable to have extensions to the zone routing protocol in order to provide a robust scalable framework for routing data in wireless ad-hoc networks when unidirectional links are present.

SUMMARY OF INVENTION

In one embodiment of the present invention provides a method for extending a zone routing protocol configured to provide a robust scalable framework for routing data in wireless ad-hoc networks when unidirectional links are present. When the reverse path from a destination node (the tail) of a unidirectional link to the originating node (the head) of the link is beyond a designated length, the invention is configured to revert to an on-demand search mechanism. The on-demand search mechanism recursively attempts to build a path to the destination by recognizing nodes that have a route to the destination. There are a number of steps that may be relied on to assist with one or more phases of the route building protocol.

In a preferred embodiment of the invention a routing protocol having both an Intra Zone Routing Protocol and an Inter Zone Routing Protocol is utilized. The Intra Zone Routing Protocol is based on a look-up table maintained by the originating node, while the Inter Zone Routing Protocol utilizes a more sophisticated, recursive "if then" protocol to seek a viable path to and from a destination node.

In another preferred embodiment the present invention provides a means and apparatus configured to find a path from the originating node to the destination node utilizing a combination of protocols. First an Intra Zone Routing Protocol is utilized to determine if a direct path exists between a source node and the destination node. If such a path exists in the outbound tree as computed by the proactive component then that path is the desired path; and the protocol terminates, having found a route. If such a path does not exist, then the source node checks if its bordercast tree is empty, if the bordercast tree is not empty then the bordercast tree is stored in the query packet, and is forwarded along the bordercast tree. One or more intermediate nodes of the bordercast tree (non-border nodes) forward the query packet until it reaches a border node, wherein a plurality of processing steps occur culminating in the sending of a bordercast. After sending the bordercast, there is a pause for a predetermined period of time equal to ENHANCEMENT_INTERVAL, during which the source node awaits either a query response or one or more enhancement messages. If a query response to the route query is received, then the route query step is termed complete and the computed route is returned to the first node. If a query response is not received, then the source node checks if an enhancement message has been received, the ENHANCEMENT_INTERVAL having passed since the initiation of the bordercast. If one or more query enhancement messages were received during the ENHANCEMENT_INTERVAL, then one or more alternate destination nodes suggested in the query enhancement message, or messages, are utilized to create an enhanced route query with a alternative set of destinations, wherein other nodes have reported that the alternative destination nodes have routes to the destination node. The new modified query is processed like the original route query and the protocol is repeated.

If the bordercasting did not result in any enhancement of the route query or in a route, the bordercast tree is incapable of reaching nodes that can enhance the query. This state is also reached when the bordercast tree is empty. In this situation a two-way tree is used to send a request to enhance the query, the source node and the border nodes forward this Query Enhancement Request using the two-way tree just as they would forward a regular query, except that the two-way tree is used for bordercasting, instead of the bordercast tree. The objective here is to try to discover nodes, which know of paths to the destination node. After waiting ENHANCEMENT_INTERVAL, the source node checks if there were any responses to the Query Enhancement Request using the two way tree. If one or more query enhancement responses were received during the ENHANCEMENT_INTERVAL, the resulting one or more destinations suggested in the Query Enhancement Response can be queried for routes to the desired destination. If there is a path to a desired destination node in an outbound tree, as computed by the proactive component then that path is the desired path and the protocol terminates.

If there are any responses to the Query Enhancement Request but there is not a path to the desired destination in an outbound tree as computed by the proactive component then the bordercast protocol is repeated. If no enhancement message was received then the destination is assumed to be unreachable and the protocol terminates.

BRIEF DESCRIPTION OF DRAWINGS

FIG. 3 is an example illustrating the outbound tree and the two-way tree; all edges are bi-directional unless drawn otherwise;

FIG. 4 illustrates outbound and two-way trees;

FIG. 6a shows Node A has a link from Node B to Node C in its outbound tree and Node B also knows of the existence of that link;

FIG. 6b shows Node A has the link from Node B to Node C, but Node B does not know of the link's existence, assume that case (b) does not occur.

DETAILED DESCRIPTION

Figure 1:
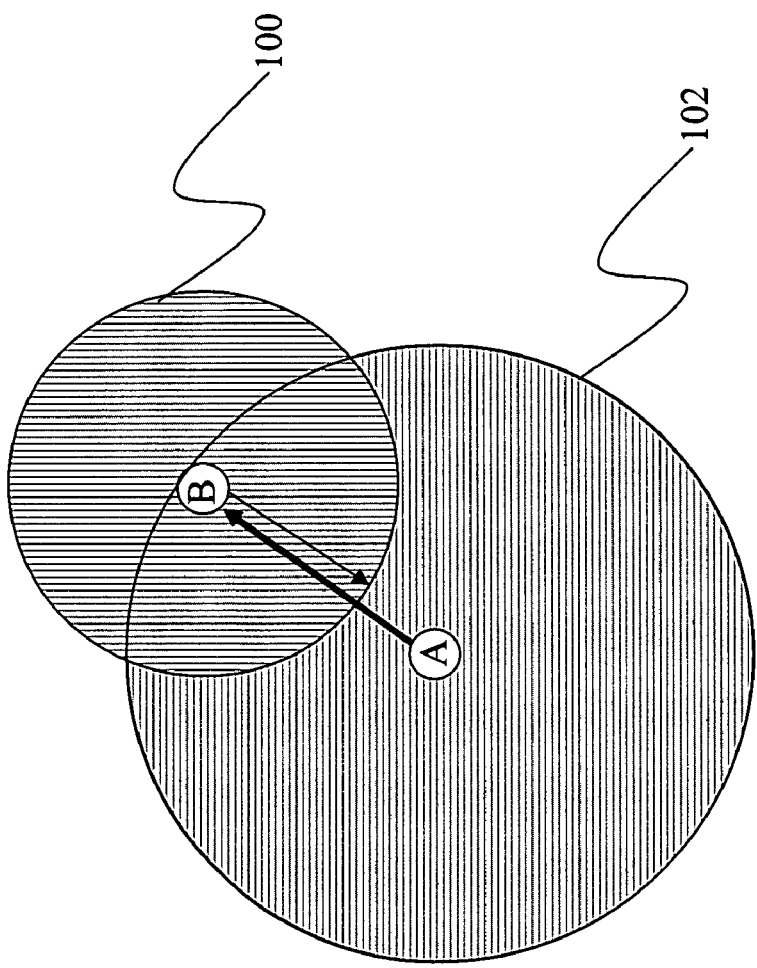
FIG. 1 heterogeneous nodes with different transmission ranges resulting unidirectional links.

The present invention provides a method and an apparatus useful for extending the utility of a zone routing protocol and configured to provide a robust scalable framework for routing data in wireless ad-hoc networks when unidirectional links are present, and may be tailored to a variety of other applications. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, with the express clarification that as this is specifically an example, no restrictive or exclusive character should be assigned to it, its purport being merely illustrative of the fundamental concept on which it is based.

The advantages and properties of the invention may be better understood by reference to the following glossary of terms.

Border Node A node, preferably at the zone radius, capable of establishing a bi-directional link with the transmitting node. The border nodes are nodes that are known to have links to nodes that the central node cannot reach by means of its outbound tree.

Bordercast The transmission of a signal, specifically targeted to nodes at the periphery of the transmitting node's transmission range, or zone. These nodes are termed border nodes. Bordercasting is an important sub-component of Inter Zone Routing Protocol. The border nodes are nodes that are known to have links to nodes that the current node cannot reach directly by means of its outbound tree. The computation of the bordercast tree is complicated by the possible existence of unidirectional links.

Bordercast tree A tree, maintained by each node, identifying that node's border nodes. The computation of the bordercast tree is complicated by the possible existence of unidirectional links. The bordercast tree addresses the border nodes specifically and instructs all other, non-border nodes to discard the message.

Central Node An arbitrary term used to denote a node that has border nodes. In actuality virtually all nodes are both central nodes and border nodes. Thus when querying, a node may be a central node, and when being queried, that same node may be a border node.

Intra-Zone Routing Provides a routing protocol with application in situations where a Protocol first node and a second node are both within the same zone. Each node, including a first node is said to be surrounded by a zone, this zone, despite substantial overlap, is commonly unique to each node, The nodes with which the first node has bi-directional links define the perimeter of the zone.

Inter-Zone Routing Provides a routing protocol with application in situations where a Protocol first node and a second node are not within the same zone.

Unidirectional links Occur when a first transmitting node has sufficient transmission power such that a first receiving node can be reached but the first receiving node cannot transmit with enough power to reach the first transmitting node. Thus there is a unidirectional communication link. Unidirectional links occur most commonly when there are a plurality of heterogeneous nodes, as shown in FIG. 1, having different transmission ranges. The range of node B is shown in 100 and the range of node A is shown in 102. In this situation node B detects node A's signal but node A does not detect node B's signal, thus a unidirectional link comes into existence. It should be noted that any number of factors, or a combination of factors can affect a node's transmission range.

Zone radius Is defined by the distance from a first node to the outermost nodes forming bi-directional links with said first node.

Query enhancement Is the process of trying to compute a list of alternate destinations. The query enhancement mechanism is a part of the Inter Zone Routing Protocol algorithm. It is utilized for computing routes that include unidirectional links with inclusive cycles larger than the zone size. In the event that a route to a destination is not discovered, the query enhancement mechanism computes a set of alternative destinations that are known to have paths to the desired destination. The original sender then queries for this set of "alternative destinations", by initiating a fresh query. Repeating the same mechanism can further enhance this enhanced query. For practical implementations, the maximum number of times that a query may be enhanced may be limited to some predetermined value. The query enhancement protocol treats bi-directional links as consisting of two separate unidirectional links.

Two-way tree When the bordercast tree fails to compute a route to the destination either because the tree is empty or because the unidirectional links prevented any route computation or query enhancement, a two-way tree is used to possibly reach a different set of nodes in an attempt to enhance the query.

Alternate Destination Alternate destination nodes are nodes that are known to have nodes routes to the desired destination One embodiment of the present invention includes a routing protocol having both a proactive component and a reactive component. An Intra-Zone Routing Protocol provides the proactive component of the invention, while an Inter-Zone Routing Protocol provides the reactive component and is only utilized when the outbound tree maintained by the Intra Zone Routing Protocol of a node does not have a path to the destination. In essence the system maintains an outbound tree for the nodes within a first node's zone radius. Where zone radius is understood to define the radius of an ascertainable zone around each node. If the first node does find the destination node within its outbound tree the message is relayed directly. In the situation where the destination node is not within the first node's outbound tree than the Inter-Zone Routing Protocol is used.

Intra Zone Routing Protocol: the Proactive Component

The goal of the Intra Zone Routing Protocol algorithm is to maintain an outbound tree to a plurality of nearby nodes. Some networks are comprised entirely of bi-directional links. In such networks a zone routing protocol defines the zone as consisting of nodes which are within ZONE_RADIUS hops. In one embodiment of the present invention, the zone membership of a node is not determined by the number of hops to the node, but rather by the number of hops from the node. Thus, for a first node to be in the zone of a second node, the first node must be reachable from the second node in ZONE_RADIUS hops or less.

For computing the outbound tree, every node utilizes packets of information called "units" that are obtained from one or more nearby nodes. Every node formulates a unit that comprises the following information, for simplicity assume that node x is being considered:

a) IN (Inbound Neighbors): The set of neighbors which have a link to the node x.

b) ON (Outbound Neighbors): The set of neighbors to which node x has a link.

c) OT (Outbound Tree Nodes): The nodes on the outbound tree of node x (computed from the units obtained from other nodes).

d) SN (Sequence Number)

e) UF (Urgent Flag): If this flag is set, then the unit is to be forwarded as soon as possible. This is typically used when the unit is generated after the deletion of a link since mis-information about presence of a link should be removed from other nodes' routing tables as soon as possible, in order to avoid incorrect route computations.

f) TTL (Time to Live): Number of hops up to which the unit can be further forwarded. The TTL is initialized to the ZONE_RADIUS and is decremented as the unit traverses a path.

At startup, IN, ON, and OT are each initialized to "empty". A sequence number is assigned to the SN field and the UF is not set. The information in the IN field of a unit is used for computing the outbound tree. The sequence number, SN is used to identify the most up-to-date unit when more than one unit is received. The ON and OT fields are used for computing the bordercast tree and for the query control mechanisms used in the Inter Zone Routing Protocol. The fields IN and ON have a space complexity bounded by the maximum degree of a node, i.e., the size of the IN field is O(D), where D is the maximum degree of a node. The field OT has a space complexity of the maximum number of nodes in a zone, i.e., the size of the OT field is $O(N_z)$, where $N_z$ is the maximum number of nodes in a zone. Hence, the Intra Zone Routing Protocol message size depends on the maximum degree of a node and the maximum number of nodes in a zone, which in turn depends on the ZONE_RADIUS. One significant aspect that should be noted here is that the size of the unit is independent of the network size, and hence this element is important to the scalability of the protocol.

Periodically (with period BEACON_INTERVAL), each unit is updated and a new sequence number is assigned. A packet that includes the node's unit, in addition to units from other nodes for which the TTL has not become zero, is then locally broadcast. Other nodes use sequence numbers to keep track of the latest unit initiated by a node. Each unit has a purge time interval, which is determined by the parameter: UNIT_PURGE_TIME_INTERVAL associated with each unit. If a link goes down, then the node, on which the link was incident, creates a new unit and sets the urgent flag for this unit. The urgent units, may optionally be immediately forwarded in a separate packet, rather than waiting for the next beacon to be generated.

Using the information in the IN field of each received unit, the outbound tree is computed periodically. For computing the outbound tree, the link information from the IN fields of all received and stored live units (which have not expired) are used to construct a graph which represents a partial network. As an example, let node x be in the process of computing the outbound tree, and let node x have a unit that originated at node i. If this unit includes nodes j, k and l in the IN field, then links j→i, k→i and l→i are added to the graph being constructed. A shortest path algorithm, such as Dijkstra's algorithm, is then used to compute the shortest path tree from node x to other nodes. Thus the Intra Zone Routing Protocol supports the maintenance of an outbound tree from every node.

Routing of Data Packets within a Zone

Any routing protocol may be used for routing within a zone. A shortest path tree may be computed from node x to other nodes within its zone. However, it is to be noted that the entire route might have to be included in the packet. This is required since, for some unidirectional links present along the path to the destination, the presence of the link might not be known to the node at the head of the unidirectional link. Thus, the head node might not even be aware of the existence of the tail node of the unidirectional link and if only the address of the next border node is provided, the node might not be able to forward the packet appropriately. Providing a source route will enable the node to not only forward packets correctly but also to cache the information with regards to the unidirectional links and use the cached information for subsequent routing requests. Additional information might also be cached or propagated to enable more efficient routing, provided that such caching does not result in excessive overhead.

Inter Zone Routing Protocol: the Reactive Component

The purpose of the Inter Zone Routing Protocol algorithm is to compute routes when the outbound tree computed by the Intra Zone Routing Protocol does not have a route to the destination. Inter Zone Routing Protocol mainly relies on a mechanism called bordercasting, which stands for forwarding the route request to a subset of nodes (border nodes) using the bordercast tree.

When the routing layer receives a route request, the outbound tree is first inspected to look for a route to the desired destination. If this lookup fails, the route request is forwarded by the node to its border nodes (the methodology for choosing border nodes is described in a subsequent subsection) by using its bordercast tree. If a border node knows a path to the destination, then the particular border node responds to the query; otherwise bordercasting is repeated at the border node. Every border node that receives the query and does not know a path to the destination, checks its inbound tree to see if it knows of alternate nodes which have a path to the desired destination. If such nodes exist, the border node then sends a query enhancement message to the sender informing it of these alternate destinations which might be queried for, in order to reach the desired destination. If the source of the query does not receive a route response message within a preset time interval, the ENHACEMENT_INTERVAL, it then checks for any received query enhancement messages. If at least one query enhancement message has been received then the alternate destination or destinations that were specified in the query enhancement message or messages are specified in a newly created enhanced query message. This enhanced query is then processed like a new query. However, the number of times that a query can be enhanced is usually limited to a preset number, since multiple queries for the same destination might lead to large latencies in route computation.

The above mechanism assumes small inclusive cycles. To enhance the performance of the protocol for large inclusive cycles a heuristic approach is used, the approach is outlined below. If the source does not receive a response to a query, either a query response message or a query enhancement message, within a preset time-out referred to as the ENHANCEMENT_INTERVAL, the source issues a fresh query to enquire about nodes that know of partial paths to the destination. Thus the source learns of alternate destinations for which it can issue a fresh query. Since the bordercast nodes have already been queried, the heuristic uses an alternate enhancement tree to attempt to reach a different subset of border nodes. Furthermore, when the bordercast tree is empty such an alternate enhancement tree request will be transmitted. For this alternative enhancement, a two-way bordercast tree (to be described in a subsequent subsection) may be used. The two-way bordercast tree is utilized to initiate a modified bordercast. The two-way tree is a shortest path tree such that all nodes in the tree are two-way nodes. Two-way nodes are those nodes in a querying node's outbound tree that can reach the querying node by using their own outbound trees. The advantage of using such a tree is that all nodes on this tree are known to have a reverse route to the current node, unlike the original bordercast tree, in which only the border nodes are required to be two-way nodes. This two-way feature is used when responding to a route query. It is to be noted that the leaves of the two-way tree may be different from the leaves of the bordercast tree described previously.

The following provides a non-exclusive list of the different kinds of Inter Zone Routing Protocol messages deployed:

1. Route Query Request (RQRQ): It is targeted for one destination and is generated by the source of the query. This message is bordercast using the bordercast tree.
2. Query Enhancement Request (QERQ): A message explicitly requesting other nodes to respond if they know of alternate nodes that have paths to the original destination, so that these nodes can then be queried for as alternate destinations. This message is bordercast using the two-way tree bordercast when either the bordercast tree is empty or when it has failed to reach nodes that know of alternate destinations.
3. Enhanced Route Request (ERRQ): This message is similar to the Route Query Request except for the fact that it cannot be enhanced any further if it has already been enhanced MAX_NUMOF_ENHANCEMENTS times, the upper limit on the number of times that a query can be enhanced. Thus, a counter is incremented each time an RQRQ or QERQ is transmitted to keep track of the number of times it has been enhanced, and the request is transmitted when the counter has achieved MAX _ NUMOF _ENHANCEMENTS is the ERRQ.
4. Query Response (QR): QR is generated as a response to a RQRQ or QERQ, when a border node knows a path to the destination by means of its outbound tree. This response is sent back using the reverse path formulated by the recorded traversed path in the query. The path recorded consists of only the border-nodes processing the query, and by virtue of the fact that the border nodes (in the bordercast tree) are two-way nodes; the reversed sequence of border nodes can be followed on the reverse path. The non-border nodes visited in the reverse path could be different from the ones traversed on the forward path.
5. Query Enhancement Response (QER): This message could be generated for an RQRQ, QERQ or an ERRQ. For an ERRQ, a QER can be sent back to the original source only if the query can be enhanced at least once more (based on the MAX_NUMOF_ENHANCEMENTS). It is generated if the border node does not have a path to any of the queried destinations but it knows of at least one node with a path to at least one of the queried destinations by means of its inbound tree. The set of nodes which are known to have a path to the subset (or complete set) of queried destinations are then reported back to the source node, which then adds these nodes to the set of alternate destinations to form a modified ERRQ, if this query does not result in the discovery of a path to any of the former destinations.

As described above, the bordercast tree and the two-way tree are very crucial to the functioning of the Inter Zone Routing Protocol. Some mechanisms that are a part of the Inter Zone Routing Protocol, especially the query control mechanisms are based on the assumption that the packets are transmitted reliably and are not dropped by a lower layer (e.g., MAC layer dropping packets due to failure in accessing the channel). The following sub-sections describe these two trees in detail, and the section concludes with a detailed description of the Inter Zone Routing Protocol.

The bordercast tree is a tree used for sending a bordercast message to a set of nodes. When the destination is not reachable by using the outbound tree computed by Intra Zone Routing Protocol, this tree is used for forwarding the route query. As the bordercast tree, preferably, is a shortest path tree, it is a sub-graph of the outbound tree. Additional properties that the bordercast tree needs to satisfy include:

1. When a route has been discovered from a source node to a destination node, unlike in the case of bi-directional networks, it is possible that the query response may not be able to retrace the path traversed by the query in the reverse direction, as one or more of the links traversed in the forward path may be unidirectional. It appears that another query for discovering a path from the destination to the source might be required. However, if each border node has the preceding querying border node (let each border node involved in the query be denoted as a center node) in their outbound trees then the same center nodes can be used to tunnel the query response back to the source. A node in the outbound tree that has a path to the root node of the tree is defined as a two-way node. The set of two-way nodes is determined using the list of nodes in the outbound tree (OT); note that the list is a field in the unit. Hence, it is essential that each border node be a two-way node.
2. The border nodes are supposed to lead to destinations that are being searched for. Hence, they must have links incident to nodes outside the bordercast tree. The list of outbound neighbors (ON; also a field in the units) is used to identify the nodes from which such links are incident. Such nodes are candidates for being chosen as border nodes.
3. The inner nodes of the bordercast tree should not be candidates for border nodes. Note that, the inner nodes of the bordercast tree do not have links incident to nodes that are not a part of the outbound tree of the querying node.

Based on the above criteria, the following algorithm is used for Constructing the bordercast tree:

1. Identify the two-way nodes in the outbound tree. The nodes that are one hop away on the outbound tree are always two-way nodes. This is based on the following argument: Let node B be a node at a distance of one hop from node A in the outbound tree of node A. As node A is using the link from node A to node B, node A must have node B's unit, implying that the path from node B to node A must be less than the ZONE_RADIUS. The link from node A to node B and the reverse path from node B to node A together form a cycle of length at most ZONE_RADIUS+1. Hence node B would also know of a path to node A from its Intra Zone Routing Protocol.
2. Mark nodes (may or may not be two-way nodes) in the outbound tree that have outbound neighbors not belonging to the outbound tree, as candidates for being border nodes.
3. Unmark a marked node if there is another marked node on the path from that node to the root of the outbound tree (which is in fact the node initiating the bordercast). Since the leaves of the bordercast tree are going to be the final border nodes, two nodes along the same path on the tree, from the root, cannot be border nodes. If the candidate node closer to the root (say A) is not selected as a border node in the final bordercast tree, then some of the nodes that A can reach, and which are outside the outbound tree might not be reachable at all by the route query.
4. Initialize the bordercast tree to the smallest rooted sub-tree of the outbound tree, which has the border nodes (marked as in Steps 2 and 3) as its leaves.
5. If there is a border node that is not a two-way node then delete the sub-tree rooted at its parent from the border cast tree.
6. Repeat 5 until all such nodes are pruned.

Figure 2:
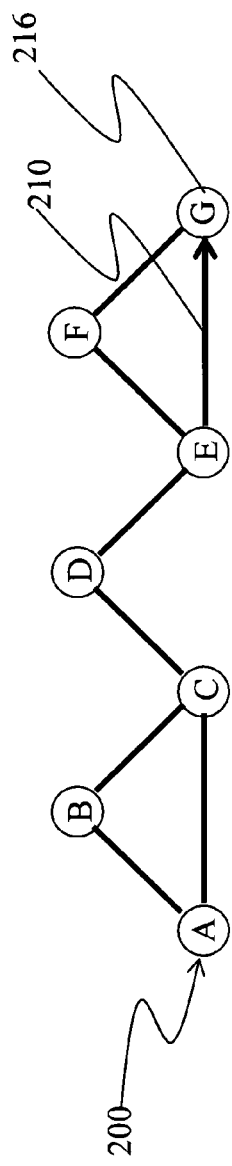
FIG. 2 is an example illustrating the outbound tree and the bordercast tree; all edges are bi-directional unless drawn otherwise.
Figure 2:
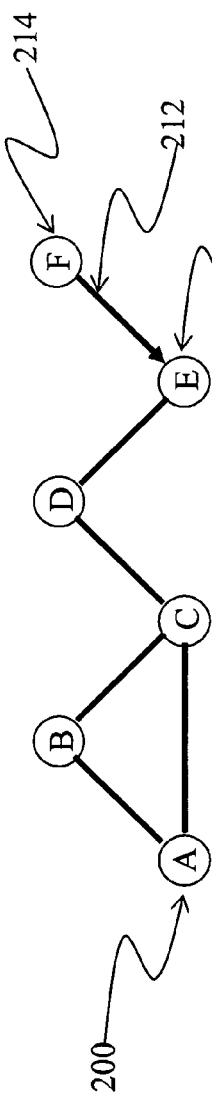
Figure 2:
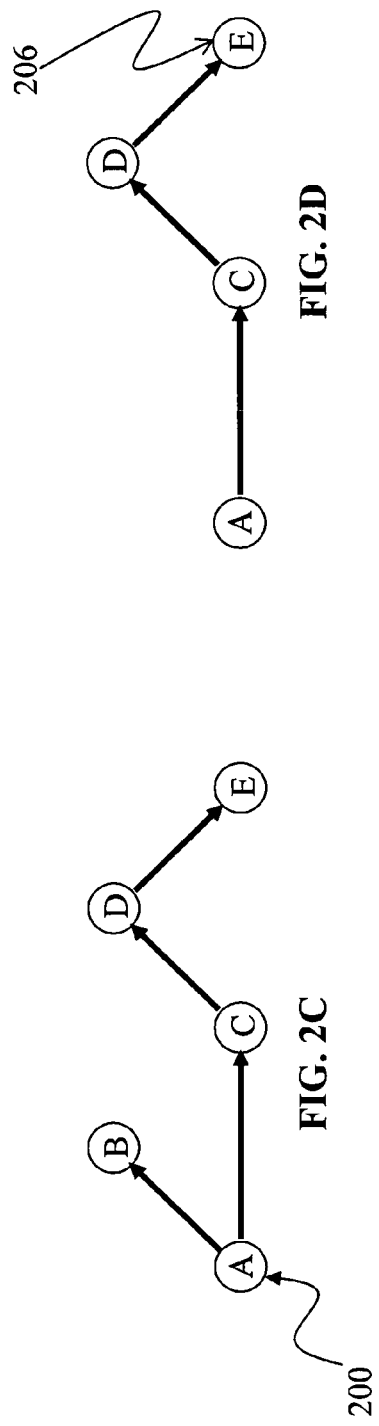

Thus, this algorithm computes a bordercast tree such that the border nodes are two-way nodes. The illustration provided in FIG. 2 shows the formation of the outbound tree and the bordercast tree. For the purposes of this discussion all edges are bi-directional unless drawn otherwise. A network having only one unidirectional link 210 is presented in FIG. 2A, in this case the ZONE_RADIUS is assumed to be 3. The links that are known to node A 200 are shown in FIG. 2B, it should be noted that nodes having a path of ZONE_RADIUS hops or less have broadcast their units, which contain their inbound neighbors. For example, the link FE 212 is known at node A 200 because node E 206 has a path of ZONE_RADIUS hops to node A. But the shortest path from F to A is 4 (more than ZONE_RADIUS) hops, and hence, the link EF 212 incident on node F 214 is not known at node A 200. The outbound tree at the node A 200 is shown in FIG. 2C, the outbound tree at node A 200 is computed from the available link state information. It is essentially the shortest path tree computed from the link state shown in FIG. 2B. Utilizing the outbound tree from FIG. 2C, the bordercast tree is computed, and this tree has only one border node, namely node E 206, since node E 206 knows of links to nodes including node F 214 and node G 216 corresponding to the links EF 212 and EG 210 that do not belong to the outbound tree. This is made known to node A 200 by the ON field of the unit that originated at node E 206. Finally FIG. 2D shows the outbound tree used by node A 200 to communicate with node E 206.

The two-way tree is used to find alternate destinations. Alternate destinations are nodes that are known to have routes to the desired destination. The process of trying to compute the list of alternate destinations is termed as query enhancement. When the bordercast tree fails to compute a route to the destination either because the tree is empty or because the unidirectional links prevented any route computation or query enhancement, the two-way tree is used to possibly reach a different set of nodes in an attempt to enhance the query.

In the query enhancement phase, an objective is to be able to reach some nodes that were not reached by the bordercast tree. So a tree is needed whose leaves are two-way nodes (so that the query response can be sent back through the same border nodes) and is different from the bordercast tree. Therefore the two-way tree is defined as the largest sub-tree of the outbound tree that has all of its nodes as two-way nodes.

An outbound tree is illustrated in FIG. 3, the two-way tree and the enhancement mechanism with a wireless ad-hoc network.

Many networks will have one or more unidirectional links, for example, FIG. 3a shows an eight node network having two unidirectional links, the first is between node 8 and node 1, and the second, between node 3 and node 4. In this embodiment of the invention, the ZONE_RADIUS is assumed to be 3. The link state information available at node 6 is shown in FIG. 3b. Based on the available link state, node 6 computes the outbound tree, which is shown in FIG. 3c. Since none of the non-root nodes in the outbound tree, namely 4, 5, 7 and 8 have reported outbound links to nodes not in the outbound tree; none of the nodes are a part of the bordercast tree. So, the bordercast tree is empty in this case. However, all these nodes, 4, 5, 7 and 8 have reported to node 6 that node 6 exists in their outbound trees, using the OT field of the corresponding units. Thus the two-way tree is same as the outbound tree for this example and is illustrated in FIG. 3c.

If node 6 issues a query request with the destination node as node 1, then first, node 6 finds that the outbound tree does not have a route to node 1. The problem stems from the fact that the inclusive cycle for the unidirectional link from node 8 to node 1 is too large for a zone radius of 3, and so node 8 is not aware of the link to node 1. Hence node 6 has to initiate a bordercast. But since it has an empty bordercast tree, it tries to enhance the query by asking other nodes if they know of nodes having paths to the destination. An alternate enhancement tree, such as the two-way tree may then used to send the query enhancement request. When the request reaches node 4, it computes the inbound tree to the destination (node 1), using the link state it currently possesses. The idea of the inbound tree to the destination is to compute shortest paths to the destination from other nodes. Thus node 4 is able to compute that node 8 is an alternate destination for node 1. This inbound tree to node 1 (trivially the link 8 to 1 here) is reported back to the source (node 6). After the ENHANCEMENT_INTERVAL, the source issues a new query request with a list of alternate destinations obtained from the query enhancement responses obtained. This new request only has one alternate destination (specifically node 8). Since the source has a path to the node 8 in its outbound tree, the route computation is completed, the discovered route being through the nodes 7 and 8 to the destination, node 1.

The illustration presented in FIG. 4a shows a network, FIG. 4b sets forth an outbound tree and FIG. 4c shows an example of a two-way tree. The ZONE_RADIUS is 3 for this example and all links are unidirectional in the network shown in FIG. 4a. The distance from any node to node F is not in excess of 3 hops and hence node F knows the entire topology. Using this knowledge node F computes the outbound tree, as shown in FIG. 4b. Note that outbound tree of node F has a path to node E, whereas the outbound tree of node E does not have a path to node F. In fact, the outbound tree of node E will be empty as the only outgoing link from node E is link EA, and the shortest path from A to E is 4 hops, which is larger than the ZONE_RADIUS. Thus all outbound tree nodes need not be two-way. In the outbound tree of node F, only nodes A, B and C are two-way. The largest rooted sub-tree of the outbound tree with all nodes being two-way nodes, i.e., the two-way tree is shown in FIG. 4c. Nodes A, B and C learn of the paths to F as they lie on the cycle FABC, whose length of 4 is 1 more than the ZONE_RADIUS. As opposed to the previous example, this example also illustrates that the two-way tree need not be same as the outbound tree. Note that if the outbound tree is empty (like in the case of node E), no Intra Zone Routing Protocol is possible and hence the system will have to rely on an on-demand flood mechanism to discover a destination node.

The Inter Zone Routing Protocol Algorithm

Figure 5A:
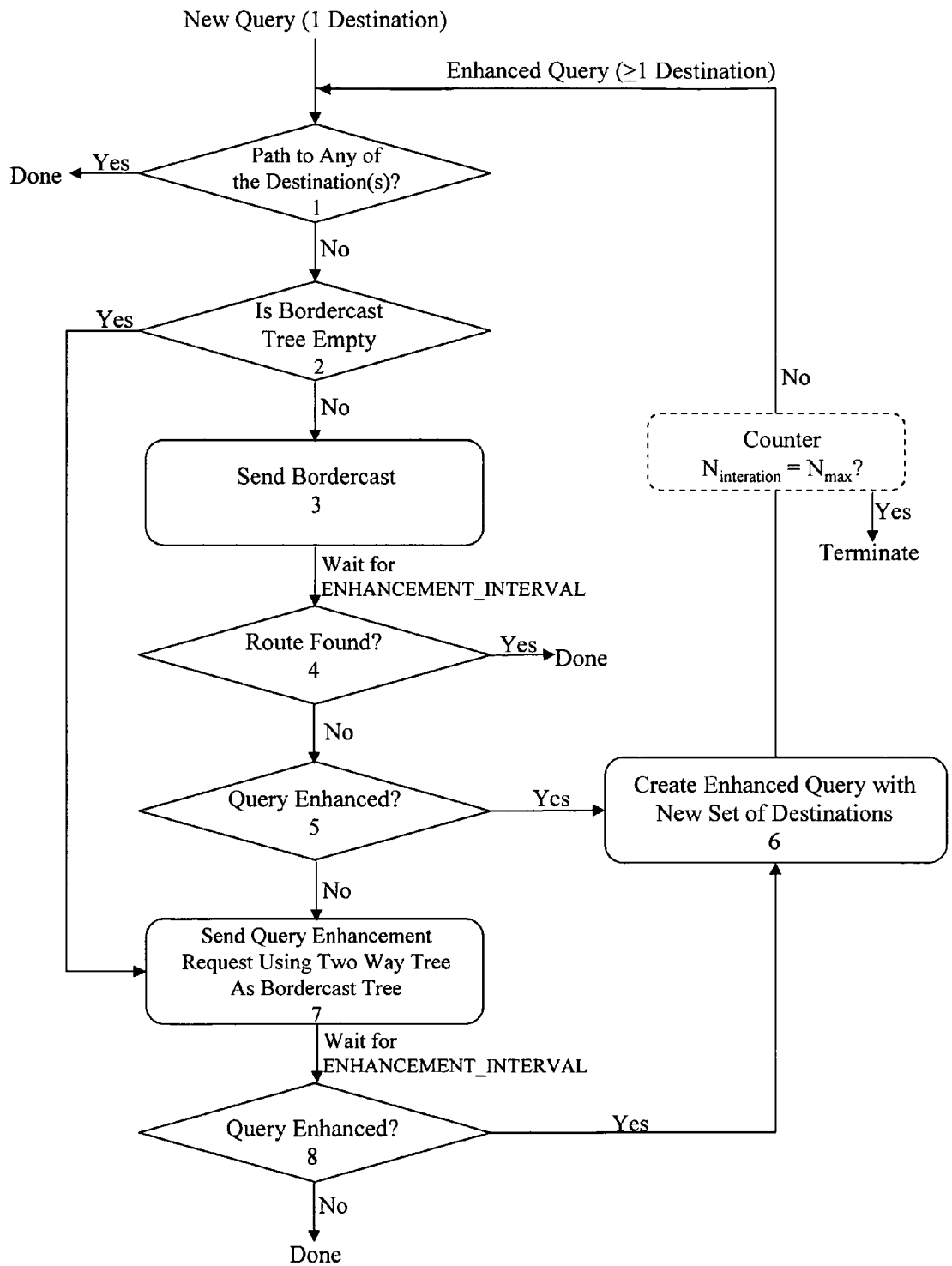
FIG. 5a depicts flow charts showing the functioning of the Inter Zone Routing Protocol at the source.

The functioning of the Inter Zone Routing Protocol algorithm at the source and at the border nodes are presented as two different flow charts in FIG. 5, as the processing at the border nodes is different from that at the source. The details of the flow chart at different states are described below. The functionality of the states in FIG. 5a are as follows:

State 1: A new query initiated by the node has one destination and an enhanced query will have a set of destinations. If there is a path to any of the destinations in the outbound tree computed by the Intra Zone Routing Protocol algorithm, the path found is the desired path.

State 2: The bordercast tree could be empty (For an example refer to FIG. 3). In such a case an attempt is made to use a different tree to do the bordercasting to possibly learn about alternate nodes that know of one or more paths to the original destination.

Figure 5B:
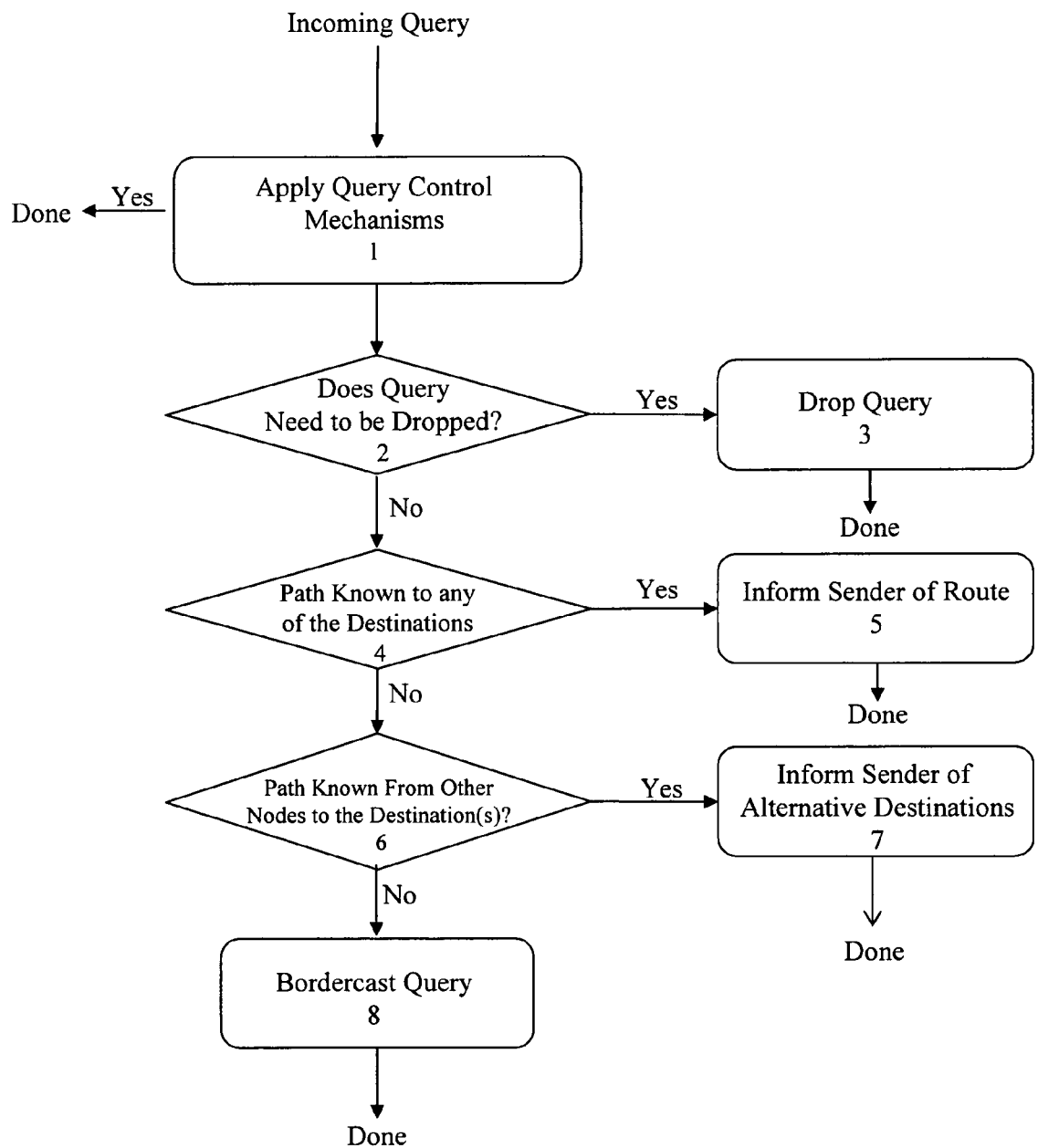
FIG. 5b depicts flow charts showing the functioning of the Inter Zone Routing Protocol at an intermediate border node.

State 3: The bordercast tree is stored in the query packet and is forwarded along the same tree. The intermediate nodes of the bordercast tree (non-border nodes) forward the query packet until it reaches a border node. The processing at the border node is shown in FIG. 5b. After sending the bordercast, there is a pause for ENHANCEMENT_INTERVAL, during which the source waits either for a query response or enhancement messages.

State 4: If a response to the route query is received in the interim, then the query processing is termed complete and the computed route is returned to the higher layer.

State 5: Since a query response is not received, the source node checks for the reception of an enhancement message, the ENHANCEMENT_INTERVAL having passed since the initiation of the bordercast. If there were one or more query enhancement messages received in that interval, then the alternate destination(s) suggested in the query enhancement message(s) are queried for as they are supposed to have routes to the original destination.

State 6: A set of alternate destinations is formed from the query enhancement messages and is inserted into a new modified query, which is processed like the original query. For practical implementations, the number of times that a query can be enhanced should be limited to reduce the amount of query traffic and the latency in finding routes, as every enhancement and repeated query for the same original destination increases the route discovery latency. For simplicity of presentation, the flow chart does not limit the number of times that the query can be enhanced.

State 7: Since the bordercasting did not result in any enhancement of the query, the bordercast tree is incapable of reaching nodes that can enhance the query (assuming no message losses). This state is also reached from the State 2, when the bordercast tree is empty. A different tree, namely the two-way tree, is then used for sending a request to enhance the query. The source and the border nodes forward this Query Enhancement Request (QERQ) just like they would forward a regular query, except that the two-way tree is used for bordercasting, instead of the bordercast tree. The key idea here is to try and discover nodes, which know of paths to the destination.

State 8: After waiting for ENHANCEMENT_INTERVAL, the source node checks to see if there were any responses to the request.

Once again, as in State 5, if there were one or more query enhancement responses (QERs) received in that interval, the alternate destination(s) suggested in the QERs can be queried for as they are supposed to have routes to the desired destination. If no such enhancement message was received then the destination is assumed to be unreachable.

The various states of FIG. 5b are explained below. This flow chart shows the manner in which a query is processed at a border node.

State 1: Apply the Query Control Mechanisms, namely Query Detection (QD) and Early Termination (ET). These mechanisms are described later herein. This essentially involves extracting the query identifier and matching it with the recently cached query identifiers seen by the node. If the query identifier has been seen before, then the query can be dropped.

State 2: The node checks to identify if the query is to be dropped or sent out as another bordercast.

State 3: The query is dropped as the Query Control Mechanisms have identified this query thread to be unnecessary.

State 4: If a path is known to any of the destinations in the query, then the route discovery is complete.

State 5: A response to the query is initiated which contains the computed path (only the border nodes, also referred to as center nodes, traversed by the route query packet are recorded). The response is sent along a path that traverses the same center nodes. This is possible because each center node has a path to the previous center node. Thus, the response is forwarded from one center node to another center node until it reaches the source node, which initiated the query.

State 6: Inbound trees are computed for each of the destinations being queried. The links discovered by the Intra Zone Routing Protocol are used to compute these trees. If any such trees exist and can be computed, then the nodes (besides the destinations) in these inbound trees would denote the alternate destinations. These trees are computed using a mechanism similar to the one used for computing the outbound trees. The IN field of the live units available at the node are used to construct a graph. Then for each destination the shortest path algorithm is executed on the graph by considering each destination as a sink node. Any shortest path algorithm (such as the Dijkstra's algorithm) can be used to compute these inbound trees.

State 7: The inbound trees computed in State 3 are sent back to the Sender using the same mechanism as in Step 2 above.

State 8: The node ID is stamped on the query packet and it is then sent out using the bordercast mechanism. If the query is a Route Query Request (RQRQ) or Enhanced Query Request (EQRQ) then the bordercast tree is used for bordercasting. If instead, the request is a Query Enhancement Request (QERQ), the two-way tree is used for bordercasting.

Query Control Mechanisms are often used in the Inter Zone Routing Protocol. Each bordercast usually results in increasing the number of query threads (unless there is only one border node). As a result of this, typically with every bordercast, the number of query threads keeps increasing. These query threads may result in the degeneration of the zone routing protocol to flooding. The Query Control Mechanisms are used to stop unnecessary route query threads, which are probing previously queried zones. These mechanisms were originally proposed for bi-directional networks for ZRP and have been modified to function with unidirectional networks in this invention.

The Query Detection (QD) mechanism is used to identify nodes that do not need to initiate bordercast. Trivially, the nodes which have already initiated bordercast (e.g., the source node) or have been border nodes in some bordercast of the same query, need not perform subsequent bordercasts for the same query if there are no enhancements. To identify a query, the query identifier, which is a pair consisting of the source address and a unique query number assigned by the source, is used. Each border node keeps track of query identifiers seen in the recent past (based on the largest time taken by a query to transit from one node to another). After a border node receives a query, if the query identifier matches an identifier stored in the cache, then the node simply drops the query.

Furthermore, if a node (say node x) has already been a non-border relay node for some query, it does not need to initiate a bordercast or be a border node for a subsequent query thread with the same query identifier. When an earlier query passed through node x, node x would have been selected as a border node if it were a candidate for being a border node. Hence, each non-border node also keeps track of query identifiers seen in the recent past. Thus QD helps in limiting the number of bordercasts that can take place, to the number of nodes in the network.

Although QD provides an upper bound on the number of bordercasts for a single query, it does not prevent previously traversed nodes (central and non-central) from being a non-central node in the future. The Early Termination (ET) protocol states that if a query has visited a node (as a border node or otherwise), then it need not transport a thread for the same query to any other border node. For this it is assumed that if node A's outbound tree has a link from node B to node C, then node B also knows of the link from node B to node C. This condition might not hold in some cases. It appears that if the network has a large percentage of unidirectional links, then this condition might not hold. FIG. 6 illustrates it with an example. The ZONE_RADIUS is assumed to be three. In both the networks, FIGS. 6a and 6b, node A learns about the link from node B to node C. In FIG. 6a, node B knows of the link from node B to node C, because it is bi-directional. Further, in FIG. 6a, node A has the link from Node B to Node C in its outbound tree and Node B also knows of the existence of that link, again because the link is bi-directional. In FIG. 6b, node B does not learn of the link because the path from node C to node B is more than 3 (ZONE_RADIUS) hops. In essence node A has the link from node B to node C, but node B does not know of the link's existence. For the purposes of this invention it will be assumed that the scenario set forth in FIG. 6b does not occur.

Based on the foregoing, assume that node B has been a border node for a particular query. Subsequently, a bordercast message for the same query from node D is to use node B as a non-border node with node C as a node following B in the bordercast tree. Then by the assumption, node B knows about the existence of the link to node C and hence, node B would have already considered that link, when it received the bordercast message in its role as a border node. So, the bordercast message from node D can be dropped at node B.

Further assume node B has been a non-border node, as would be the case where an earlier bordercast originated with a different node, say node M, and now a bordercast for the same query from node D is to use node B as a non-border node with node C as a node following node B in node D's bordercast tree. Then by the assumption, node B knows about the existence of the link to node C and hence, the existence of the link BC must have been propagated to node M and this information must have been taken into account by node M when this node M constructed its bordercast tree. So, the bordercast message from node D can be dropped at node B.

The above two cases do not specifically consider the latency incurred while updating link information and possible discrepancy of information between different nodes about the existence/non-existence of links.

Hence QD and ET together imply that a node need not process a query thread if the node has seen that query before. So, for implementing QD and ET, the query identifier is cached at every node processing the query, and is kept for a short preset time interval. If any other query thread with the same identifiers is received in that interval, then it is dropped without further processing. Thus, the number of messages propagated for a single query is upper-bounded by the number of links in the network, which is same as the number of messages required for flooding the network. It is to be noted that this upper bound is applicable for a Route Query Request (RQRQ), or a Route Enhancement Request (RERQ), or an Enhanced Route Request (ERRQ). As shown in FIG. 3A, a route request may result in the source first sending out a RQRQ, then sending out a RERQ upon receiving no response and then sending out an enhanced query (ERRQ) if it gets a response to the enhancement request (QER). Assuming that MAX_NUMOF_ENHANCEMENTS is set to one, these three messages, namely RQRQ, RERQ and ERRQ together achieve a message complexity of three times the number of links in the network.

The present invention extends the Zone Routing Protocol for functioning in networks with unidirectional links. The most common reason for the presence of unidirectional links is the difference in transmission capabilities of the mobile nodes. The present invention provides intra zone and inter zone routing protocols that work for unidirectional links. For unidirectional links with large (larger than ZONE_RADIUS) inclusive cycles, a mechanism for recursive enhancement of the query is used. The nodes that do not know of the destination but know of alternate nodes that have paths to the destination are reported back to the source. If the query is unresolved the source then issues an enhanced query that computes route for one or more of the alternate destinations. A heuristic may also be utilized to solicit enhancement messages from nodes when all the previous mechanisms fail to compute routes due to unidirectional links with large inclusive cycles. One embodiment of the present has been implemented using the ns-2 simulator. The results show that even in the presence of a large number of unidirectional links and high mobility of 20 m/s, about 90% queries are resolved with a very high accuracy (correctness of route) of 90%. The proposed enhancement mechanism by itself is responsible for route computation in 40% of the cases and the routes computed due to this enhancement are valid 80% of the time, in scenarios with mobility of 20 m/s and 40% of nodes having low transmission ranges. Thus, the present invention provides an extended Zone Routing Protocol configured for use in networks with unidirectional links.

What is claimed is:

1. A method for routing data in wireless ad-hoc networks comprising the steps of:

providing a proactive component; configured to route messages utilizing an intra zone routing protocol and providing a reactive component; configured to route messages utilizing a inter zone routing protocol and providing a bordercast tree, configured to bordercast to a plurality of border nodes; and providing at least one query packet comprising data, wherein nodes receiving one or more query packets are configured to provide at least one query response or discard query packet;

wherein the method follows the following additional steps:

i. a first route query is initiated by a first node or a source node and has one destination node;

ii. if there is a path to a destination node in an outbound tree as computed by the proactive component, then that path is the desired path and the intra-zone routing protocol terminates, otherwise;

iii. the source node checks if its bordercast tree is empty:
  a. if the bordercast tree is empty go to step viii;
  b. if the bordercast tree is not empty go to step iv;

iv. the bordercast tree is stored in the query packet, and is forwarded along the bordercast tree, and at least one intermediate nodes of the bordercast tree (non- border nodes), forward the query packet until it reaches a border node, wherein a plurality of processing steps occur culminating in the sending of a bordercast:
  a. after sending the bordercast, there is a pause for a predetermined period of time equal to ENHANCEMENT_INTERVAL, during which the source node awaits either a query response or one or more enhancement messages;

v. if a query response to the route query is received, then the route query step is termed complete and the computed route is returned to the first node;

vi. if a query response is not received, then the source node checks if an enhancement message has been received, the ENHANCEMENT_INTERVAL having passed since the initiation of the bordercast; if one or more query enhancement messages were received during the ENHANCEMENT_INTERVAL, then one or more alternate destination nodes indicated in the query enhancement message, or messages, are utilized to create an enhanced route query with a alternative set of destinations, wherein other nodes have reported that the alternative destination nodes have routes to the destination node; the enhanced route query is processed like a first route query; go to step ii;

vii. if the bordercasting did not result in any enhancement of the route query or in a route, the bordercast tree is presumed incapable of reaching nodes that can enhance the query; this state is also reached from step ii when the bordercast tree is empty; in this situation a two-way tree is used to send a request to enhance the query, the source node and the border nodes forward this Query Enhancement Request using the two-way tree just as they would forward a regular query, except that the two-way tree is used for bordercasting, instead of the bordercast tree; wherein nodes are discovered viii. after waiting for ENHANCEMENT_INTERVAL, the source node checks to see if any responses to the query enhancement request using the two way tree exist, if one or more query enhancement responses are received during the ENHANCEMENT_INTERVAL, the resulting one or more destinations indicated in the query enhancement response can be queried for routes to the desired destination, if there is a path to a desired destination node in an outbound tree as computed by the proactive component, then that path is the desired path; and the protocol terminates;

ix. if there are any responses to the query enhancement request but there is not a path to the desired destination in an outbound tree as computed by the proactive component then go to step iii;

x. if no enhancement message was received then the destination is assumed to be unreachable and the protocol terminates.

2. The method for routing data in wireless ad-hoc networks as set forth in claim 1, wherein in step iv the plurality of processing steps include:

a. receiving incoming query from step iv above;

b. applying at least one query control mechanism to the query;

c. using the criteria from the at least one Query Control Mechanism to drop unnecessary query threads,
   i. if all threads are dropped, then go to step viii of claim 1;

d. determining if a path is known to at least one destination and
   i. if a path is known notify the sender of the path and route query is complete;
   ii. if a path is not known;

e. checking if a path is known from other nodes to at least one destination node:
   i. if yes inform sender of alternative destinations;
   ii. if not go to step f;

f. bordercasting query g. returning to step iv a of claim 1.

3. The method as set forth in claim 2 wherein the at least one query control mechanism of step b includes a Query Detection (QD) and an Early Termination (ET) mechanism; these mechanisms are configured to extract a query identifier and match it with recently cached query identifiers seen by the node; if the query identifier has been seen before, then the query can be dropped.

4. The method as set forth in claim 2 wherein the notification of a path, to the sender, of step d i is accomplished by:

a. initiating a response to the query that contains the computed path, only the border nodes, (also referred to as center nodes), traversed by the route query packet are recorded; the response is sent along a path that traverses the same center nodes; where each center node has a path to the previous center node, wherein the response is forwarded from one center node to another center node until it reaches the source node, that initiated the query.

5. The method as set forth in claim 2 wherein the checking if a path is known from other nodes to at least one destination node of step e is accomplished by:

a. discovering links using the Intra Zone Routing Protocol;

b. computing inbound trees for each of the destinations being queried;
   i. if any such trees exist and can be computed, then the nodes (other than the destination nodes) in these inbound trees denote the alternate destinations.

6. The method as set forth in claim 5 wherein the inbound trees are computed using a mechanism wherein a plurality of node neighbors having a link to the transmitting node are used to construct a graph of destinations; and for each destination, a shortest path protocol is executed on the graph by considering each destination as a sink node, any shortest path protocol can be used to compute these inbound trees.

7. The method as set forth in claim 6 wherein the shortest path protocol is Dijkstra's algorithm.

8. The method for routing data in wireless ad-hoc networks as set forth in claim 1, wherein the maximum number of hops between the first node and the border node is 3.

9. The method for routing data in wireless ad-hoc networks as set forth in claim 1, wherein the number of hops between the first node and the border node is periodically reset.

10. The method for routing data in wireless ad-hoc networks as set forth in claim 1, wherein the number of hops between the first node and the border node is dynamically updated based on a situational awareness protocol.

11. The method for routing data in wireless ad-hoc networks as set forth in claim 1, wherein there is a counter that limits the number of enhancements.

12. The method for routing data in wireless ad-hoc networks as set forth in claim 11, wherein the limit on the counter that limits the number of enhancements is determined by the method for routing data.

13. The method for routing data in wireless ad-hoc networks as set forth in claim 11, wherein there is a counter that limits the number of enhancements to a predetermined number is selected based on memory resources allocated to the method for routing data.

14. The method for routing data in wireless ad-hoc networks as set forth in claim 1, wherein the ENHANCEMENT_INTERVAL is variable.

15. The method for routing data in wireless ad-hoc networks as set forth in claim 1, wherein the ENHANCEMENT_INTERVAL is varied and the variation is based on the number of nodes adjacent to the source node.

16. The method for routing data in wireless ad-hoc networks as set forth in claim 1, wherein a transmission path is not the same as a return path.

17. The method for routing data in wireless ad-hoc networks as set forth in claim 1, wherein the data packet includes at least one of the following:

a. a set of node neighbors which have a link to the transmitting node;

b. a set of node neighbors with which the transmitting node has a link;

c. any nodes on the outbound tree of the transmitting node;

d. a sequence number;

e. an urgent flag, which provides data concerning link status;

f. a time to live counter which tracks the number of hops up to which the data packet can be forwarded, the time to live counter is initialized to the ZONE_RADIUS, and is incremented as the data packet traverses a path.

18. The method for routing data in wireless ad-hoc networks as set forth in claim 17, wherein the nodes on the outbound tree of the transmitting node are computed from the units obtained from other nodes.

19. An apparatus for routing data in wireless ad-hoc networks comprising:

a proactive element, configured to route messages utilizing an intra zone routing protocol; and a reactive element, configured to route messages utilizing a inter zone routing protocol; and a bordercast tree element, configured to bordercast to a plurality of border nodes; and at least one query packet memory element comprising data, wherein nodes receiving one or more query packets are configured to provide at least one query response or discard the query packet;

wherein the apparatus includes:

i. a first means for initiating a route query from a first node or a source node and wherein the route query concerns a route to a destination node;

ii. a central means determines if there is a path to a destination node in an outbound tree, as computed by the proactive element, and, if such a path is found, that path is the desired path; and the apparatus transmits its message; otherwise iii. the source node checks if its bordercast tree is empty:
   a. if the bordercast tree is empty go to step viii;
   b. if the bordercast tree is not empty go to step iv;

iv. the bordercast tree is stored in the query packet, and is forwarded along the bordercast tree, one or more intermediate nodes of the bordercast tree (non-border nodes), forward the query packet until it reaches a border node, wherein a plurality of processing steps occur culminating in the sending of a bordercast:
   a. after sending the bordercast, there is a pause for a predetermined period of time equal to ENHANCEMENT_INTERVAL, during which the source node awaits either a query response or one or more enhancement messages;

v. if a query response to the route query is received, then the route query step is termed complete and the computed route is returned to the first node;

vi. if a query response is not received, then the source node checks if an enhancement message has been received, the ENHANCEMENT_INTERVAL having passed since the initiation of the bordercast; if one or more query enhancement messages were received during the ENHANCEMENT_INTERVAL, then one or more alternate destination nodes indicated in the query enhancement message, or messages, are utilized to create an enhanced route query with an alternative set of destinations, wherein other nodes have reported that the alternative destination nodes have routes to the destination node; the enhanced route query is processed like the route query; by returning to step ii;

vii. if the bordercasting did not result in any enhancement of the route query or in a route, the bordercast tree is incapable of reaching nodes that can enhance the query (assuming no message losses); this state is also reached from step ii, when the bordercast tree is empty; in this situation a two-way tree is used to send a request to enhance the query and the source node and the border nodes forward this Query Enhancement Request using the two-way tree just as they would forward a regular query, except that the two-way tree is used for bordercasting, instead of the bordercast tree; the objective here is to try to discover nodes, which know of paths to the destination node;

viii. after waiting for ENHANCEMENT_INTERVAL, the source node checks to see if any responses to the query enhancement request using the two way tree exist; if one or more query enhancement responses are received during the ENHANCEMENT_INTERVAL, the resulting one or more destinations indicated in the query enhancement response can be queried for routes to the desired destination, if there is a path to a desired destination node in an outbound tree as computed by the proactive component then that path is the desired path and the protocol terminates;

ix. if there are any responses to the query enhancement request but there is not a path to the desired destination in an outbound tree as computed by the proactive component then go to step iii;

x. if no enhancement message was received then the destination is assumed to be unreachable and the protocol terminates.

20. The apparatus for routing data in wireless ad-hoc networks as set forth in claim 19, wherein in step iv the plurality of processing steps include:
   a. receiving incoming query from step iv above;
   b. applying at least one query control mechanism to the query;
   c. using the criteria from the at least one Query Control Mechanism to drop unnecessary query threads,
      i. if all threads are dropped, then go to step viii of claim 19;
   d. determining if a path is known to at least one destination and
      i. if a path is known, notify sender of the path and route discovery is complete;
      ii. if a path is not known then go to the next step;
   e. checking if a path is known from other nodes to at least one destination node:
      i. if yes, inform sender of alternative destinations;
      ii. if not;
   f. bordercasting query
   g. returning to step iv a of claim 19.

21. The apparatus as set forth in claim 20 wherein the at least one query control mechanism of step b includes a Query Detection (QD) and an Early Termination (ET) mechanism; these mechanisms are configured to extract a query identifier and match it with recently cached query identifiers seen by the node; if the query identifier has been seen before, then the query can be dropped.

22. The apparatus as set forth in claim 20 wherein the notification of a path to the sender, of step d i is accomplished by:
   a. initiating a response to the query that contains the computed path, only the border nodes, (also referred to as center nodes), traversed by the route query packet are recorded; the response is sent along a path that traverses the same center nodes; where each center node has a path to the previous center node, wherein the response is forwarded from one center node to another center node until it reaches the source node, that initiated the query.

23. The apparatus as set forth in claim 20 wherein the checking if a path is known from other nodes to at least one destination node of step e is accomplished by:
   a. discovering links using the Intra Zone Routing Protocol;
   b. computing inbound trees for each of the destinations being queried;
      i. if any such trees exist and can be computed, then the nodes (other than the destination nodes) in these inbound trees denote the alternate destinations.

24. The apparatus as set forth in claim 23 wherein the inbound trees are computed using a mechanism wherein a plurality of node neighbors having a link to the transmitting node are used to construct a graph of destinations; and for each destination, a shortest path protocol is executed on the graph by considering each destination as a sink node, any shortest path protocol can be used to compute these inbound trees.

25. The apparatus as set forth in claim 24 wherein the shortest path protocol is Dijkstra's algorithm.

26. The apparatus for routing data in wireless ad-hoc networks as set forth in claim 19, wherein the maximum number of hops between the first node and the border node is 3.

27. The apparatus for routing data in wireless ad-hoc networks as set forth in claim 19, wherein the maximum number of hops between the first node and the border node is periodically reset.

28. The apparatus for routing data in wireless ad-hoc networks as set forth in claim 19, wherein the maximum number of hops between the first node and the border node is dynamically updated based on a situational awareness protocol.

29. The apparatus for routing data in wireless ad-hoc networks as set forth in claim 19, wherein there is a limiting counter configured to terminate the protocol after a predetermined number of enhancements.

30. The apparatus for routing data in wireless ad-hoc networks as set forth in claim 29, wherein the counter that limits the number of enhancements is determined by the method for routing data.

31. The apparatus for routing data in wireless ad-hoc networks as set forth in claim 29, wherein there is a counter that limits the number of enhancements to a predetermined number is selected based on memory resources allocated to the method for routing data.

32. The apparatus for routing data in wireless ad-hoc networks as set forth in claim 19, wherein the ENHANCEMENT_INTERVAL is varied.

33. The apparatus for routing data in wireless ad-hoc networks as set forth in claim 19, wherein the ENHANCEMENT_INTERVAL is varied and the variation is based on the number of nodes adjacent to the source node.

34. The apparatus for routing data in wireless ad-hoc networks as set forth in claim 19, wherein a transmission path is not the same as a return path.

35. The apparatus for routing data in wireless ad-hoc networks as set forth in claim 19, wherein the data packet includes at least one of the following:
   a. a set of node neighbors which have a link to the transmitting node;
   b. a set of node neighbors with which the transmitting node has a link;
   c. any nodes on the outbound tree of the transmitting node;
   d. a sequence number;
   e. an urgent flag, which provides data concerning link status;
   f. a time to live counter which tracks the number of hops up to which the data packet can be forwarded, the time to live counter is initialized to the ZONE_RADIUS and is incremented as the data packet traverses a path.

36. The apparatus for routing data in wireless ad-hoc networks as set forth in claim 35, wherein the nodes on the outbound tree of the transmitting node are computed from the units obtained from other nodes.

* * * * *

UNITED STATES PATENT AND TRADEMARK OFFICE
CERTIFICATE OF CORRECTION

| | | |
|---|---|---|
| PATENT NO. | : 6,990,075 B2 | Page 1 of 1 |
| APPLICATION NO. | : 09/764668 | |
| DATED | : January 24, 2006 | |
| INVENTOR(S) | : Srikanth Krishnamurthy, Prasun Sinha and Son K. Dao | |

It is certified that error appears in the above-identified patent and that said Letters Patent is hereby corrected as shown below:

On Title Page Item (73) the issued patent reads: "MRL Laboratories, LLC, Malibu CA (US)" and it should read --HRL Laboratories, LLC, Malibu, CA (US)--.

Signed and Sealed this

Thirteenth Day of March, 2007

JON W. DUDAS
*Director of the United States Patent and Trademark Office*